United States Patent
Schaeffer et al.

(10) Patent No.: US 6,731,952 B2
(45) Date of Patent: May 4, 2004

(54) MOBILE TELEPHONE SYSTEM HAVING A DETACHABLE CAMERA / BATTERY MODULE

(75) Inventors: Pierre Schaeffer, Bethesda, MD (US); Kenneth A. Parulski, Rochester, NY (US); James R. Schueckler, LeRoy, NY (US)

(73) Assignee: Eastman Kodak Company, Rochester, NY (US)

( * ) Notice: Subject to any disclaimer, the term of this patent is extended or adjusted under 35 U.S.C. 154(b) by 432 days.

(21) Appl. No.: 09/751,594

(22) Filed: Dec. 29, 2000

(65) Prior Publication Data

US 2002/0013161 A1 Jan. 31, 2002

Related U.S. Application Data

(63) Continuation-in-part of application No. 09/626,881, filed on Jul. 27, 2000.

(51) Int. Cl.[7] .................................................. H04B 1/38
(52) U.S. Cl. .................... 455/557; 455/66.1; 455/556.1
(58) Field of Search ................................ 455/66.1, 566, 455/572, 557, 556.1, 550.1; 348/372–376

(56) References Cited

U.S. PATENT DOCUMENTS

| | | |
|---|---|---|
| 5,035,861 A | 7/1991 | Grandone |
| 5,475,441 A | 12/1995 | Parulski et al. |
| 5,491,507 A | 2/1996 | Umezawa et al. |
| 5,506,617 A | 4/1996 | Parulski et al. |
| 5,948,086 A * | 9/1999 | Lin ............................. 710/100 |
| 6,122,526 A * | 9/2000 | Parulski et al. .......... 455/556.1 |
| 6,278,884 B1 * | 8/2001 | Kim ........................ 455/556.1 |
| 2001/0044330 A1 * | 11/2001 | Arnold ........................ 455/572 |
| 2002/0082043 A1 * | 6/2002 | Wilska et al. ............... 455/550 |

* cited by examiner

Primary Examiner—William Trost
Assistant Examiner—Sharad Rampuria
(74) Attorney, Agent, or Firm—Pamela R. Crocker

(57) ABSTRACT

A handheld mobile telephone system is disclosed including a detachable camera/battery module for capturing images and a mobile telephone for communicating with a receiving unit. The detachable camera/battery module includes a lens for focusing light from a scene to produce an image; an image sensor for capturing one or more images; and a converter for producing digital image signals from the at least one captured image. The detachable camera/battery module further includes a battery for supplying power to the mobile telephone system; and a first connector for detachably supplying the digital image signals and the power to the mobile telephone. The mobile telephone includes a memory for storing the digital image signals; and a processor for processing the stored digital image signals. The mobile telephone further includes a display for displaying the processed digital image signals; a second connector for interfacing with the first connector on the camera/battery module to receive the digital image signals and the power; and a radio frequency transmitter for transmitting the processed digital image signals to the receiving unit. When the camera/battery module is connected to the mobile telephone, images are captured by the camera/battery module and are transmitted to the receiving unit using the mobile telephone.

6 Claims, 6 Drawing Sheets

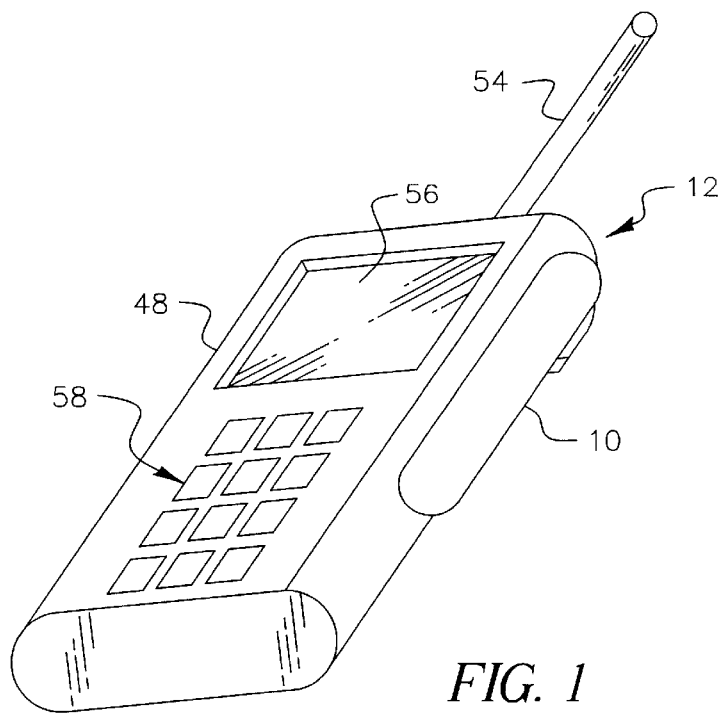
FIG. 1
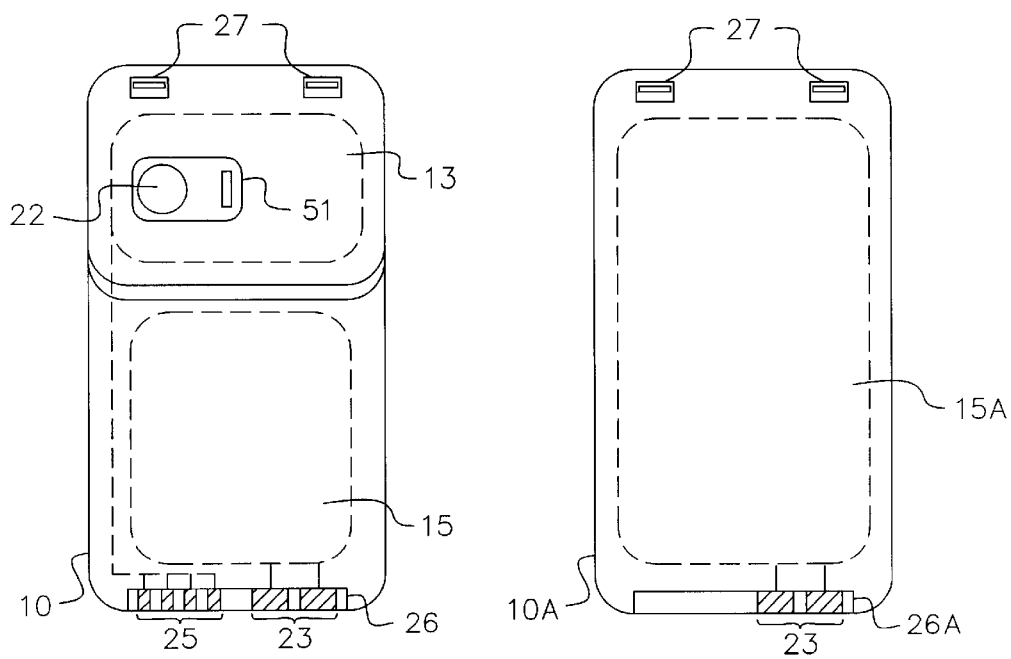
FIG. 2
FIG. 3

MOBILE TELEPHONE SYSTEM HAVING A DETACHABLE CAMERA / BATTERY MODULE

CROSS-REFERENCE TO RELATED APPLICATIONS

This is a continuation-in-part of U.S. patent application Ser. No. 09/626,881, filed Jul. 27, 2000. Reference is made to commonly-assigned U.S. patent application Ser. No. 09/654,745, filed Sep. 1, 2000, entitled "Intelligent power management system" to Orlicki et. al., the disclosure of which is herein incorporated by reference.

FIELD OF THE INVENTION

The invention is directed to a mobile telephone system including a detachable camera/battery module and a mobile telephone.

BACKGROUND

In the prior art, image data from electronic still cameras has been transmitted via conventional telephone lines to selected receivers through the use of a computer equipped with a modem. The image data must first be downloaded from the electronic still camera to the computer, which then transmits the image data to a second modem-equipped computer via the telephone line where it can be viewed or printed.

Video telephone equipment has also been developed, as described in U.S. Pat. No. 5,491,507 to Umezawa. The Umezawa device is a mobile phone that includes a video camera and video display, as well as a microphone and speaker. Because the video camera is permanently integrated into the mobile phone, the device must be sold as a single, relatively expensive device, which is both larger and more fragile than a conventional mobile phone (e.g., cell phone) since, for example, the device includes a lens and image sensor. On some occasions, a mobile phone user would like to carry a very small, rugged mobile phone, and does not need to take photographs. In such situations, the user of the Umezawa device would require a second, voice-only cell phone.

SUMMARY OF THE INVENTION

Accordingly, it is an object of the invention to provide a handheld mobile telephone having a detachable camera/battery module, so that a conventional battery-only module can be used with the mobile phone to provide a small, rugged voice-only cell phone, and the camera/battery module can be used for those occasions when the user expects to take photographs.

This object is achieved by a handheld mobile telephone system including a detachable camera/battery module for capturing images and a mobile telephone for communicating with a receiving unit, comprising:

(a) the detachable camera/battery module including:
  (i) a lens for focusing light from a scene to produce an image;
  (ii) an image sensor for capturing one or more images;
  (iii) a converter for producing digital image signals from the at least one captured image;
  (iv) a battery for supplying power to the mobile telephone system; and
  (v) a first connector for detachably supplying the digital image signals and the power to the mobile telephone;
(b) the mobile telephone including:
  (i) a memory for storing the digital image signals;
  (ii) a processor for processing the stored digital image signals;
  (iii) a display for displaying the processed digital image signals;
  (iv) a second connector for interfacing with the first connector on the camera/battery module to receive the digital image signals and the power; and
  (v) a radio frequency transmitter for transmitting the processed digital image signals to the receiving unit; and
(c) whereby, when the camera/battery module is connected to the mobile telephone, images are captured by the camera/battery module and are transmitted to the receiving unit using the mobile telephone.

BRIEF DESCRIPTION OF THE DRAWINGS

The invention will be described in greater detail with reference to certain preferred embodiments thereof and the accompanying drawings, wherein:

FIG. 1 depicts a mobile telephone system including a detachable camera/battery module and a mobile telephone in accordance with the present invention;

FIG. 2 depicts the camera/battery module of FIG. 1;

FIG. 3 depicts an alternative battery module;

DETAILED DESCRIPTION OF THE PREFERRED EMBODIMENTS

Figure 4:
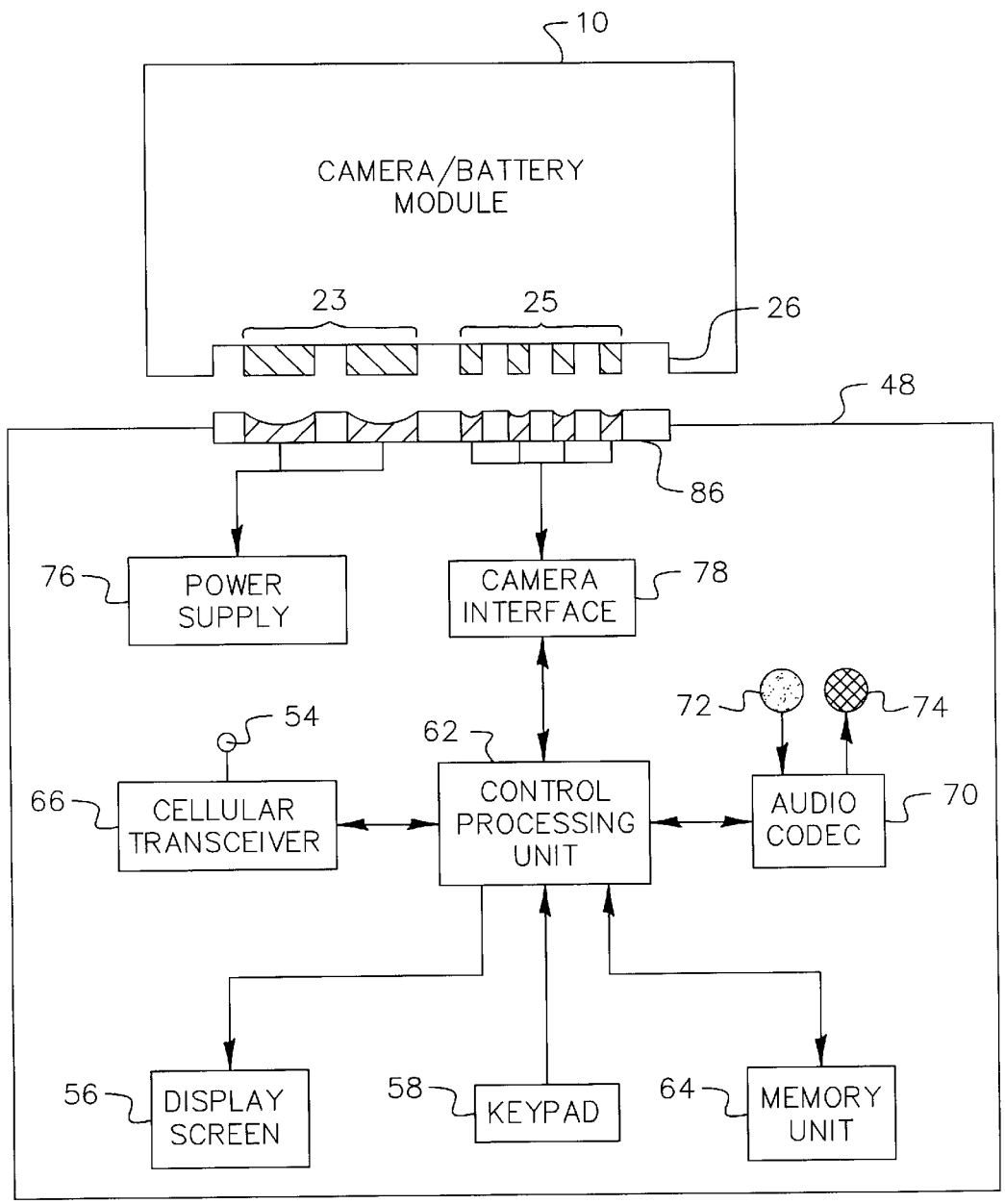
FIG. 4 is a schematic block diagram of the mobile telephone of FIG. 1.

A diagram of a mobile telephone system in accordance with the present invention is illustrated in FIG. 1. A conventional mobile (e.g., cellular) telephone 48 mates with a combined detachable camera/battery module 10 to form a handheld mobile telephone system 12. As shown in FIG. 2, the camera/battery module 10 includes a lens 22 and a sliding lens cover 51. Mounting clips 27 are provided to aid in securing the detachable camera/battery module 10 to the mobile telephone 48. The camera/battery module 10 also includes camera electronics 13, a rechargeable battery 15, and electrical contacts 26 which include power contacts 23 that provide power to the mobile telephone 48 and signal contacts 25, as will be described later with reference to FIG. 5. The mobile telephone 48 also mates with a standard battery module 10A, shown in FIG. 3. The standard battery module 10A includes a smaller (e.g., thinner and lighter) rechargeable battery 15A and electrical contacts 26A that include power contacts 23 but does not include signal contacts. The standard battery module 10A includes mounting clips 27, but does not include the lens 22 or the camera electronics 13 of the camera/battery module 10. The standard battery module 10A enables the mobile telephone 48 to operate as a normal voice-only cell phone, which is thinner and lighter than when the combined camera/battery module 10 is used.

As shown in FIG. 1, the mobile telephone 48 includes an antenna 54 and a front face including a display screen 56

(preferably a color liquid crystal display (LCD) or an organic light emitting diode (OLED) display having for example 100×100 display pixels) and a telephone keypad 58, as well as a microphone 72 and speaker 74 (shown in FIG. 4). The mobile telephone 48 can optionally include a connector for an external hands-free microphone/earpiece (not shown).

FIG. 4 is a schematic block diagram of the mobile telephone 48 in accordance with the present invention. As shown, the display screen 56 and the keypad 58 are coupled to a control processing unit 62, which may be, for example, a microprocessor. The control processing unit 62 is also coupled to memory unit 64, which includes dynamic RAM (DRAM) volatile memory, or Flash EPROM non-volatile memory, or both. The control processing unit 62 is also coupled to a cellular transceiver 66 which connects to the antenna 54 to provide a radio frequency (RF) transmitter/receiver. The control processing unit 62 is also connected to an audio codec 70 which connects to the microphone 72 and the speaker 74. The audio codec 70 provides signal amplification and analog-to-digital (A/D) conversion of the signal from the microphone 72. The audio codec 70 also includes a digital-to-analog (D/A) converter and audio amplifier to drive the speaker 74. The control processing unit 62 is also connected to a camera interface 78. The camera interface 78 provides a signal interface to control the camera/battery module 10 and to receive digital image signals from camera/battery module 10. The signals from the camera interface 78 are connected to the signal contacts of connector 86.

The electrical contacts 26 provide a connector for connecting the camera/battery module 10 to the signal contacts of the connector 86. Many different types of connectors can be used. Preferably, the electrical contacts 26 are "male" exposed metal contacts on a printed circuit board which mate with a "female" connector 86 provided within the mobile telephone 48 for receiving the exposed metal contacts. It will be understood that many other types of connectors could be utilized, and the term "connector" is intended to apply to any mechanical arrangement for providing a detachable electrical connection between the camera/battery module 10 and the mobile telephone 48.

When the camera/battery module 10 is connected to the mobile telephone 48, the electrical contacts 26 mate with the corresponding contacts of the connector 86. As a result, the signals from the camera interface 78 are connected to the signal contacts 25 of the camera/battery module 10, and the power contacts 23 from the camera/battery module 10 are connected to the power supply 76 in order to provide the required power to the circuits in mobile telephone 48.

The camera interface 78 is preferably a UART that provides an RS-232 interface, although other types of standard and non-standard interfaces can be used. Although depicted as a separate block in FIG. 4, the camera interface 78 can alternatively be provided as part of a microprocessor that serves as the control processing unit 62. Such an integrated microprocessor could also include the audio codec 70 and the memory unit 64.

Figure 5:
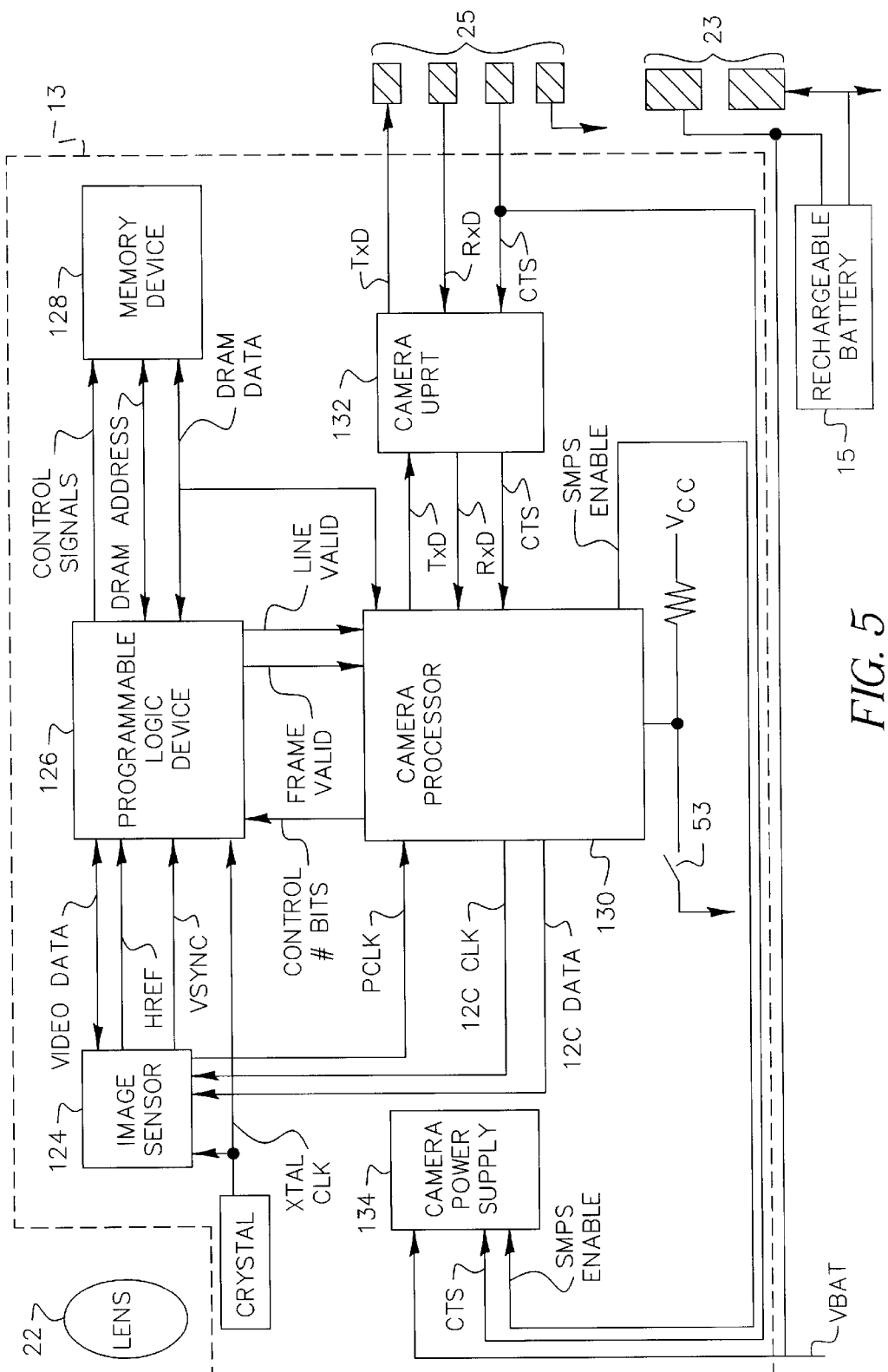
FIG. 5 is a schematic block diagram of the components of the camera/battery module of FIG. 2.

A detailed schematic block diagram of one embodiment of the camera/battery module is illustrated in FIG. 5. As shown in FIG. 5, the camera/battery module 10 includes the lens 22 that focuses light onto a CMOS image sensor 124. The image sensor can be, for example, a VGA format sensor having 640 columns and 480 rows of active photosites, overlayed with the well-known Bayer color filter array pattern. Digital image data generated by the CMOS image sensor 124 is supplied to a programmable logic device (PLD) 126 that controls the management and storage of the image data in a memory device 128 in response to control signals supplied by camera processor 130. The camera processor 130 is coupled to a UART 132, which in turn is coupled to the signal contacts 25 of the electrical contacts 26. The programmable logic device (PLD) 126 also receives a signal from the switch 53 which is activated when the lens cover 51 is in the open position.

Alternatively, the camera portion of the camera/battery module 10 can be of a form described in commonly assigned U.S. Pat. No. 5,475,441, entitled "Electronic Camera with Memory Card Interface to a Computer," the disclosure of which is herein incorporated by reference. In particular, U.S. Pat. No. 5,475,441 describes a removable camera module that fits into and interfaces with a standard PCMCIA card interface slot of a pen-based computer, or of a type described in commonly assigned U.S. Pat. No. 5,506,617, entitled "Electronic Camera Incorporating a Computer-Compatible Bus Interface", the disclosure of which is herein incorporated by reference, which describes a removable camera module that interfaces directly to a standard personal computer compatible bus.

Power for both the camera electronics 13 and the mobile telephone 48 is provided by the rechargeable battery 15. The power supply 76 in the mobile telephone 48 includes a battery voltage sensing circuit (not shown) to determine the amount of charge remaining in the rechargeable battery 15. The camera power supply 134 in the camera/battery module 10 supplies power to the camera electronics 13. Power is supplied to the camera electronics 13 only in the user capture mode, when the user wants to take a picture and the rechargeable battery 15 has sufficient charge to complete a picture taking and transmission operation. During the audio mode, when the mobile telephone 48 is used only to provide audio transmissions, power is not supplied to the camera electronics 13, so that the image sensor 124, the PLD 126, the memory device 128, the camera processor 130 and the UART 132 are disabled and do not consume battery power.

Figure 6:
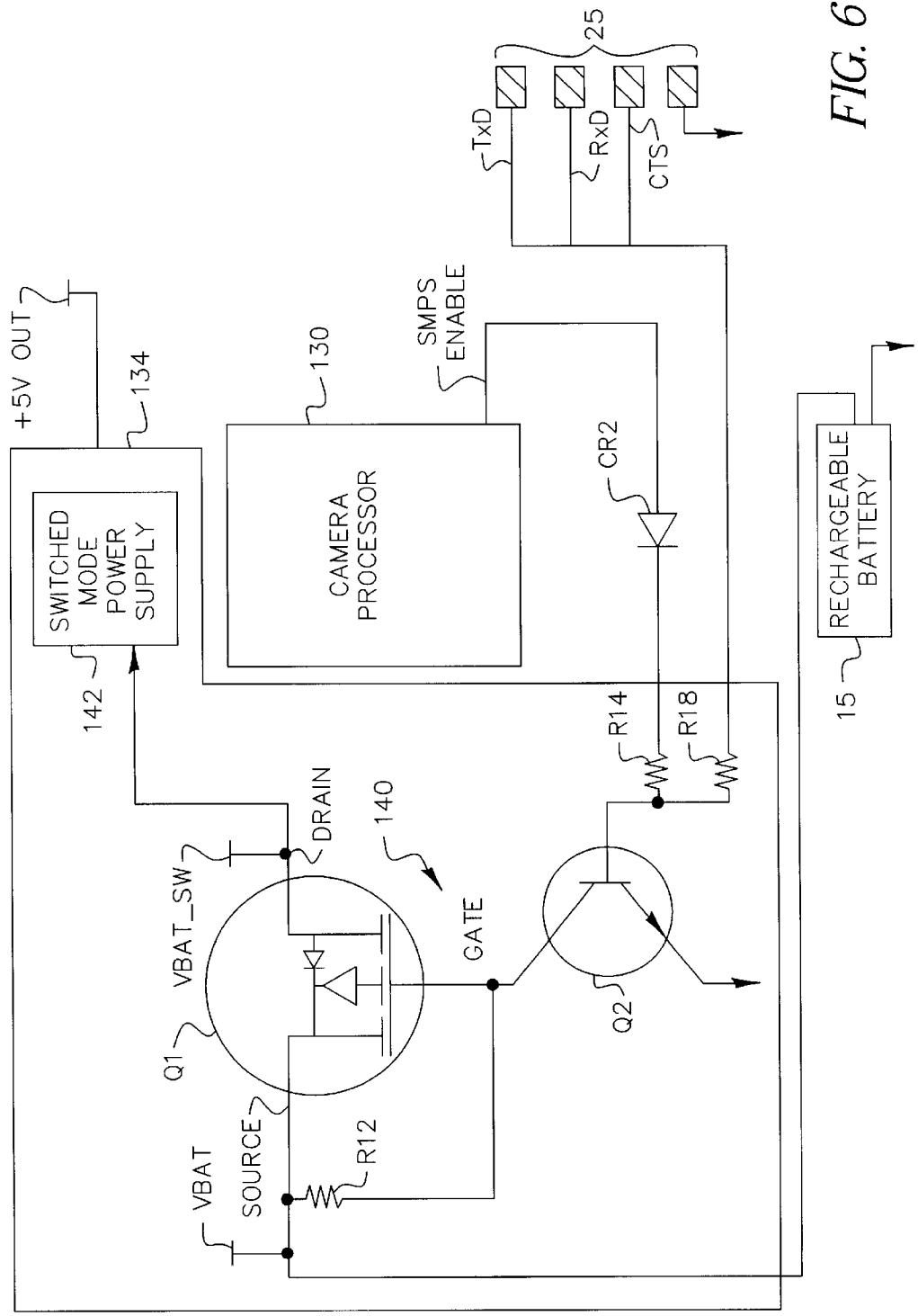
FIG. 6 is a schematic diagram of the camera power supply incorporated into the camera/battery module of FIG. 5.

The camera power supply 134 is illustrated in greater detail in FIG. 6, and includes a power management circuit 140 and a conventional switched mode power supply (SMPS) 142, although other types of power supplies or regulation circuitry could be utilized. The power management circuit 140 includes an NPN transistor Q2 having its base coupled to a first control signal line, which in the illustrated example is a switched mode power supply enable line (SMPS ENABLE), to a second control signal line, which in the illustrated example is a CLEAR-TO-SEND (CTS) control line received from the mobile telephone 48 via one of the signal contacts 25, either of which can be utilized to control the operation of the NPN transistor Q2. The NPN transistor Q2, in turn, is used to control the gate of the power FET Q1 by supplying a power activation signal thereto.

Figure 7:
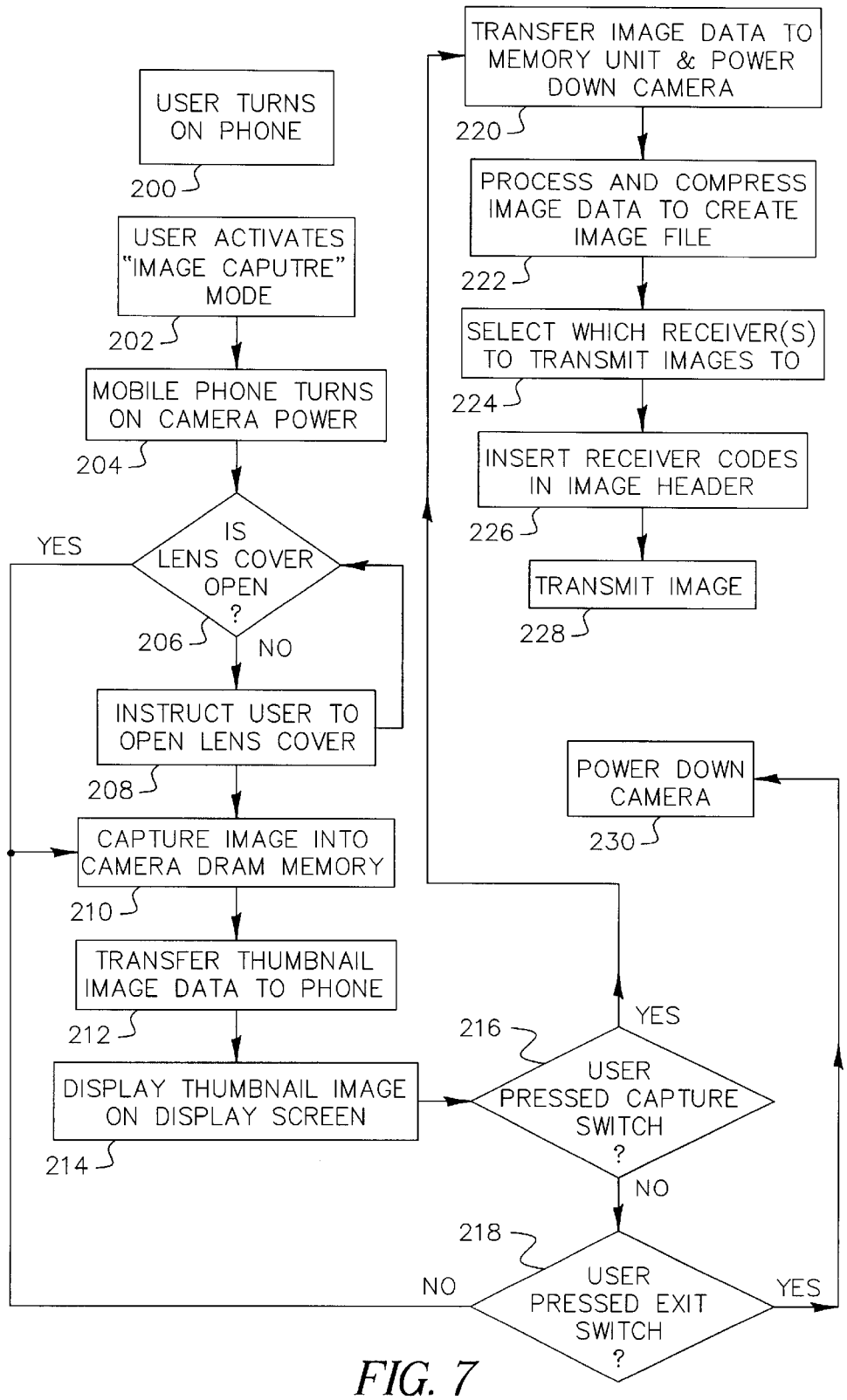
FIG. 7 is an operational flow diagram illustrating the operation of the mobile telephone system.

FIG. 7 is a flow diagram illustrating the operation of the mobile telephone system in accordance with the present invention. In block 200, the user turns on the mobile telephone 48 using a power switch (not shown) that enables power supply 76 to supply power to the other circuits of mobile telephone 48. In block 202, the user selects the "image capture" mode from a menu displayed on the display screen 56 using the appropriate keys of the keypad 58. The menu on the display screen 56 is produced by the control processing unit 62 which executes firmware stored as ROM or EPROM firmware within control processing unit 62, or alternatively, within the memory unit 64. In response to the user selecting the "image capture" mode, in block 204 the control processing unit 62 communicates via the camera interface 78 with the camera/battery module 10 in order to initiate the camera power-up sequence.

When the power to the mobile telephone 48 is first turned on in block 200, the camera interface 78 sets the CTS line low, so that the camera power supply 134 does not supply power to the rest of the camera electronics 13. As a result, the rechargeable battery 15 powers only the mobile telephone 48, and is not drained by the camera electronics 13. In block 204, the control processing unit 62, via the camera interface 78, sets the CTS signal high, which causes transistor Q2 (see FIG. 6) to turn on. The activation of transistor Q2 then causes transistor Q1 to conduct. As a result, the SMPS 142 is energized from the power supplied from the rechargeable battery 15 and power is supplied to the camera electronics 13. In block 206, the status of the cover switch 53 is checked by the camera processor 130 and communicated to the control processing unit 62 via the camera interface 78. If the status of switch 53 indicates that the lens cover 51 is closed, the control processing unit 62 provides a message on the display screen 56 instructing the user to open the lens cover 51.

In block 210, the control processing unit commands the camera processor 130 to control the image sensor 124, the PLD 126, and the DRAM memory 128 to capture an image and store the image data in the DRAM memory 128. In block 212, a subsampled thumbnail image is transferred from the DRAM memory 128 to the memory unit 64 in the mobile telephone 48 via the signal contacts 25. The subsampled thumbnail image can be created by averaging or selecting pixel values to reduce the size of the 640 ×480 pixel VGA captured image to a size appropriate for the display screen 56. This can be done by reducing the number of rows and columns by a factor of 8, in order to provide an 80 by 60 pixel image, for example. In block 214, the thumbnail image data is displayed on the display screen 56. The border of the display screen 56 may indicate which button of the keypad 58 (e.g., the upper left button) is used to capture a still image, and which button (e.g., the upper right button) can be used to exit the "image capture" mode.

In block 216, the control processing unit 62 determines if the user has pressed the capture switch. If the user has not, in block 218 the control processing unit 62 determines if the user pressed the exit switch. If the user has pressed the exit switch, in block 230 the control processing unit 62 powers down the camera electronics 13 by setting the CTS line low. When the CTS line goes low, the camera processor 130, after a short period (e.g., 2 seconds) to ensure that the CTS line did not go low as a result of noise, sets the SMPS enable line low. This causes transistor Q2 to turn off, thus turning off Q1 and removing the power to SMPS 142.

In block 218, if the user has not pressed the exit switch, the control processing unit 62 commands the camera processor 130 to repeat blocks 210, 212, and 214 in order to capture and display another thumbnail image on the display screen 56. In block 210, the new image data replaces the previous image data in the DRAM memory 128. In blocks 212 and 214, the new thumbnail image data is transferred and displayed, in place of the previous thumbnail data. As a result, the display screen 56 serves as an electronic viewfinder for the mobile telephone system 12. Blocks 210 through 218 are repeated until the user presses the capture or exit switch. Optionally, an inactivity timer can substitute for the user pressing the exit switch if a sufficient period of time (e.g., 30 seconds) has passed without the user pressing the capture button.

In block 216, when the user presses the capture switch, the control processing unit 62 commands the camera processor 130 to transfer the full resolution image data captured in block 210 via the signal contacts 25, and stores the data in the memory unit 64. The control processing unit 62 then powers down the camera electronics 13 as described earlier in relation to block 230. In block 222, the image data is processed and compressed to create a transmission-ready image file. This processing can use the method described in commonly assigned U.S. Pat. No. 5,053,861, entitled "Compression method and apparatus for single-sensor color imaging systems" to Tsai et. al., the disclosure of which is herein incorporated by reference, to compress the Bayer pattern color image data from the CMOS image sensor 124. This compressed Bayer pattern color data can then be stored in an image file, such as the well-known TIFF/EP image file defined in ISO standard 12234-2, along with metadata that describes the mobile telephone system, such as the make and model number and color filter pattern. The processing in block 222 can alternatively use the image processing algorithms described in commonly-assigned U.S. patent application Ser. No. 09/549,356, filed Apr. 14, 2000 entitled "Method and apparatus for providing a user-customizable digital camera" to Prabhu et. al., the disclosure of which is herein incorporated by reference, to produce standard JPEG compressed image data. This JPEG compressed image data can then be stored in the well-known Exif image format, along with metadata that describes the mobile telephone system, such as the make and model number and color filter pattern.

In block 224, a thumbnail image corresponding to the processed image file is displayed on the display screen 56 along with a transmission selection menu. The user has the option of transmitting the image to one or more receiver units. The receiver units can include fax machines, modem-equipped home PCs, and Internet Service Providers (ISP's). Furthermore, the receiver units can include one or more PCs which can connect to the ISP, or which can connect to another computer with which the ISP can communicate, for example, via e-mail. Each receiver has an ID (e.g., an address identifier), which is stored in the memory unit 64 along with the name or nickname of the receiver. The ID for a particular receiver may be, for example, a phone number, an e-mail address, an Internet IP address, and/or an Internet URL assigned to the receiver unit.

In block 226, the address of each receiver that has been selected to receive a particular image is inserted as a header code to be transmitted along with the image file. This header code can be a list of one or more receiver addresses included as metadata inside the TIFF/EP or Exif image file. Alternatively, this header code can be a separate list of image names, and the receiver addresses selected for each image.

Figure 8:
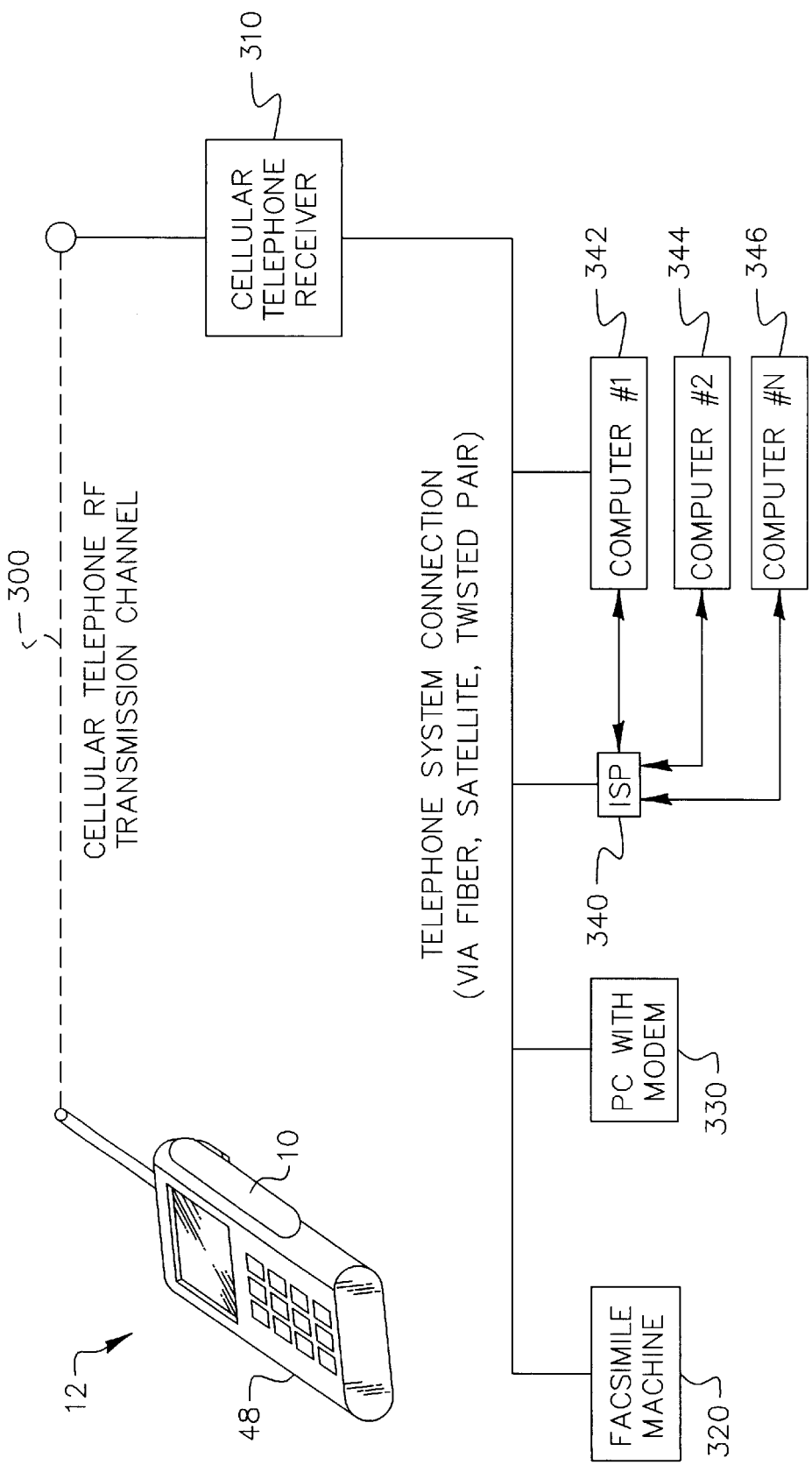
FIG. 8 is a diagram illustrating the transmission of images from the mobile telephone of FIG. 1 to one or more receiver units in accordance with the present invention.

In block 228 and as shown in FIG. 8, the mobile telephone system 12 transmits the image file and header code to a cellular telephone receiver 310 using a cellular telephone RF transmission channel 300. The cellular telephone receiver 310 receives the image and the header code, which specifies the one or more receivers selected by the user. The cellular telephone receiver 310 is normally located at the nearest cellular telephone tower. The cellular telephone receiver 310 connects, via the normal wire, fiber, and satellite telephone system connections, to receivers such as a facsimile machine 320, a personal computer (PC) 330 having an internal phone modem for receiving data, and an Internet Service Provider (ISP) 340. The ISP 340 is connected to a large number of computers, including a first home computer 342, a second home computer 344, and a third home computer 346, either directly or via separate phone lines or communications links. The computers 342, 344, 346 can, of course, include monitors for displaying the images from the mobile telephone system 12, and printers for printing these images.

As one example, in block 224 the user of the mobile telephone system 12 can select both the first home computer 342 and the second home computer 344. In this example, the header code for the transmitted image includes the phone number and user access codes for the ISP 340, and the e-mail addresses assigned to the users of computers 342 and 344 by the ISP 340. The image is transmitted a single time from the mobile telephone system 12 to the ISP 340 via the cellular telephone receiver 310. The ISP 340 then transmits the image to both the first computer 342 and the second computer 344. This can be done, for example, by sending an e-mail message with the image as an attachment to the email accounts for both the first home computer 342 and the second home computer 344, or by storing the image as a web page or other file accessible only to the users of computer 342 and 344.

In another embodiment, the user of the mobile telephone system 12 can select the receiver units to receive images (block 224) prior to capturing images (blocks 204 through 222). The memory unit 64 can include memory for multiple images, so that multiple images can be transmitted to the receiving units. In addition, the mobile telephone system 12 can be pre-programmed so that the complete image capture and telephone dialing sequence is performed each time the image capture switch is activated, or alternatively, after several images have been captured.

The invention has been described with reference to certain preferred embodiments thereof. It will be understood, however, that modifications and variations are possible within the scope of the appended claims.

Parts List
10 Camera/Battery Module
10A Standard battery module
12 Mobile telephone System
13 Camera Electronics
14 RF Transmitter Module
15 Rechargeable Battery
15A Rechargeable Battery
22 Lens
23 Power Contacts
25 Signal Contacts
26 Electrical Contacts
26A Electrical Contacts
27 Mounting Clips
48 Mobile Telephone
51 Lens Cover
53 Switch
54 Antenna
56 Display Screen
58 Keypad
62 Control Processing Unit
64 Memory Unit
66 Cellular Transceiver
70 Audio Codec
72 Microphone
74 Speaker
76 Power Supply
78 Camera Interface
86 Connector
124 Image Sensor
126 Programmable Logic Device
List (cont'd)
128 Memory Device
130 Camera Processor
132 UART
134 Camera Power Supply
140 Power Management Circuit
142 Switched Mode Power Supply
300 RF Channel
310 Cellular Telephone Receiver
320 Facsimile Machine
330 PC with Modem
340 ISP
342 First home computer
344 Second home computer
346 Third home computer

What is claimed is:

1. A handheld mobile telephone system including a detachable camera/battery module for capturing images and a mobile telephone for communicating with a receiving unit, comprising:
   (a) the detachable camera/battery module including:
      (i) a lens for focusing light from a scene to produce an image;
      (ii) an image sensor for capturing one or more images;
      (iii) a converter for producing digital image signals from the at least one captured image;
      (iv) a battery for supplying power to the mobile telephone system; and
      (v) a first connector for detachably supplying the digital image signals and the power to the mobile telephone;
   (b) the mobile telephone including:
      (i) a memory for storing the digital image signals;
      (ii) a processor for processing the stored digital image signals;
      (iii) a display for displaying the processed digital image signals;
      (iv) a second connector for interfacing with the first connector on the camera/battery module to receive the digital image signals and the power; and
      (v) a radio frequency transmitter for transmitting the processed digital image signals to the receiving unit; and
   (c) whereby, when the camera/battery module is connected to the mobile telephone, images are captured by the camera/battery module and are transmitted to the receiving unit using the mobile telephone.

2. The handheld mobile telephone system according to claim 1 wherein the mobile telephone includes a telephone keypad and wherein at least one image is captured in response to a user actuating at least one particular key on the telephone keypad.

3. The handheld mobile telephone system according to claim 1 wherein the handheld mobile telephone system is operable in an image capture mode and a audio mode, and wherein battery supplies power to the image sensor only when the mobile telephone system is in the image capture mode.

4. The handheld mobile telephone system according to claim 1 wherein the processor compresses the digital image signals prior to transmission to the receiver unit.

5. The handheld mobile telephone system according to claim 1 wherein the first and second connectors provide an RS-232 interface.

6. The handheld mobile telephone system according to claim 1 wherein the battery is a rechargeable battery.

* * * * *